United States Patent
Nojiri et al.

(10) Patent No.: US 12,292,305 B1
(45) Date of Patent: May 6, 2025

(54) LANE RECOGNITION METHOD AND LANE RECOGNITION DEVICE

(71) Applicant: Nissan Motor Co., Ltd., Yokohama (JP)

(72) Inventors: Takahiro Nojiri, Kanagawa (JP); Katsuhiko Degawa, Kanagawa (JP); Yohei Taniguchi, Kanagawa (JP); Kazuyuki Uwabo, Kanagawa (JP); Yuji Nagasawa, Kanagawa (JP); Hirotaka Kamimura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/837,080

(22) PCT Filed: Feb. 21, 2022

(86) PCT No.: PCT/JP2022/006850
§ 371 (c)(1),
(2) Date: Aug. 8, 2024

(87) PCT Pub. No.: WO2023/157274
PCT Pub. Date: Aug. 24, 2023

(51) Int. Cl.
*G01C 21/00* (2006.01)

(52) U.S. Cl.
CPC ..... *G01C 21/3822* (2020.08); *G01C 21/3841* (2020.08)

(58) Field of Classification Search
None
See application file for complete search history.

(56) References Cited

U.S. PATENT DOCUMENTS

| | | | | |
|---|---|---|---|---|
| 2012/0259539 | A1* | 10/2012 | Sumizawa | G01C 21/3658 701/400 |
| 2013/0169449 | A1* | 7/2013 | Tsunekawa | G08G 1/166 340/933 |
| 2018/0247528 | A1* | 8/2018 | Dey | G08G 1/0145 |
| 2018/0346026 | A1* | 12/2018 | Fujii | B62D 15/025 |
| 2020/0377088 | A1 | 12/2020 | Fukushige et al. | |
| 2021/0081682 | A1 | 3/2021 | Kumano et al. | |
| 2021/0146953 | A1 | 5/2021 | Horita et al. | |

FOREIGN PATENT DOCUMENTS

| | | |
|---|---|---|
| JP | 2019-207190 A | 12/2019 |
| JP | 2020-015482 A | 1/2020 |
| JP | 2021-124813 A | 8/2021 |

* cited by examiner

*Primary Examiner* — Daniel L Greene
*Assistant Examiner* — Robert L Pinkerton
(74) *Attorney, Agent, or Firm* — Young Basile Hanlon & MacFarlane, P.C.

(57) ABSTRACT

A lane recognition method and a lane recognition device operate such that when a travel lane of a vehicle is recognized by performing cross-check between first boundary information about a boundary dividing lanes acquired from map information and second boundary information about the boundary dividing the lanes acquired from a detection device of the vehicle, a movable center line is detected from at least one of the first boundary information and the second boundary information. The movable center line is a center line that can move in a width direction of a road on which the vehicle travels. When the movable center line is detected, the cross-check between the first boundary information and the second boundary information is not performed on one of a right side and a left side of the vehicle on which the movable center line is detected.

6 Claims, 5 Drawing Sheets

LANE RECOGNITION METHOD AND LANE RECOGNITION DEVICE

TECHNICAL FIELD

The present invention relates to a lane recognition method and a lane recognition device.

BACKGROUND

A self-position estimation device is known (JP2019-207190A), in which when the self-position of an automobile on a map is estimated based on an image around the automobile, a state quantity of the automobile, such as a vehicle speed, the latitude and longitude of a location at which the automobile is located, and map data, an increase/decrease section of the number of lanes on a road is recognized from the image, and when the increase/decrease section of the number of lanes is recognized, weighting of an estimated position based on the map data is set smaller than that when the increase/decrease section of the number of lanes is not recognized, thus correcting the estimated position of the automobile.

SUMMARY

The above prior art, however, has a problem in that when the position of the center line changes in the width direction of the road, the lane information acquired from the image around the vehicle and the lane information acquired from the map information do not match, and there is a possibility that the traveling position of the vehicle cannot be accurately estimated.

A problem to be solved by the present invention is to provide a lane recognition method and a lane recognition device that are able to suppress erroneous recognition of the traveling position of a vehicle.

The present invention solves the above problem through when recognizing a travel lane of a vehicle by performing cross-check between first boundary information about a boundary dividing lanes acquired from map information and second boundary information about the boundary dividing the lanes acquired from a detection device of the vehicle, detecting a movable center line from at least one of the first boundary information and the second boundary information, the movable center line being a center line that can move in a width direction of a road on which the vehicle travels, and upon detection of the movable center line, not performing the cross-check between the first boundary information and the second boundary information on one of a right side and a left side of the vehicle on which the movable center line is detected.

According to the present invention, it is possible to suppress erroneous recognition of the traveling position of the vehicle.

DETAILED DESCRIPTION

Hereinafter, one or more embodiments of the present invention will be described with reference to the drawings. The following description is made on the assumption that the vehicle travels on the right side in a country having a right-side traffic regulation. In countries having left-side traffic regulations, vehicles travel on the left side, so the right and left in the following description are to be read symmetrically.

Configuration of Driving Assistance System

Figure 1:
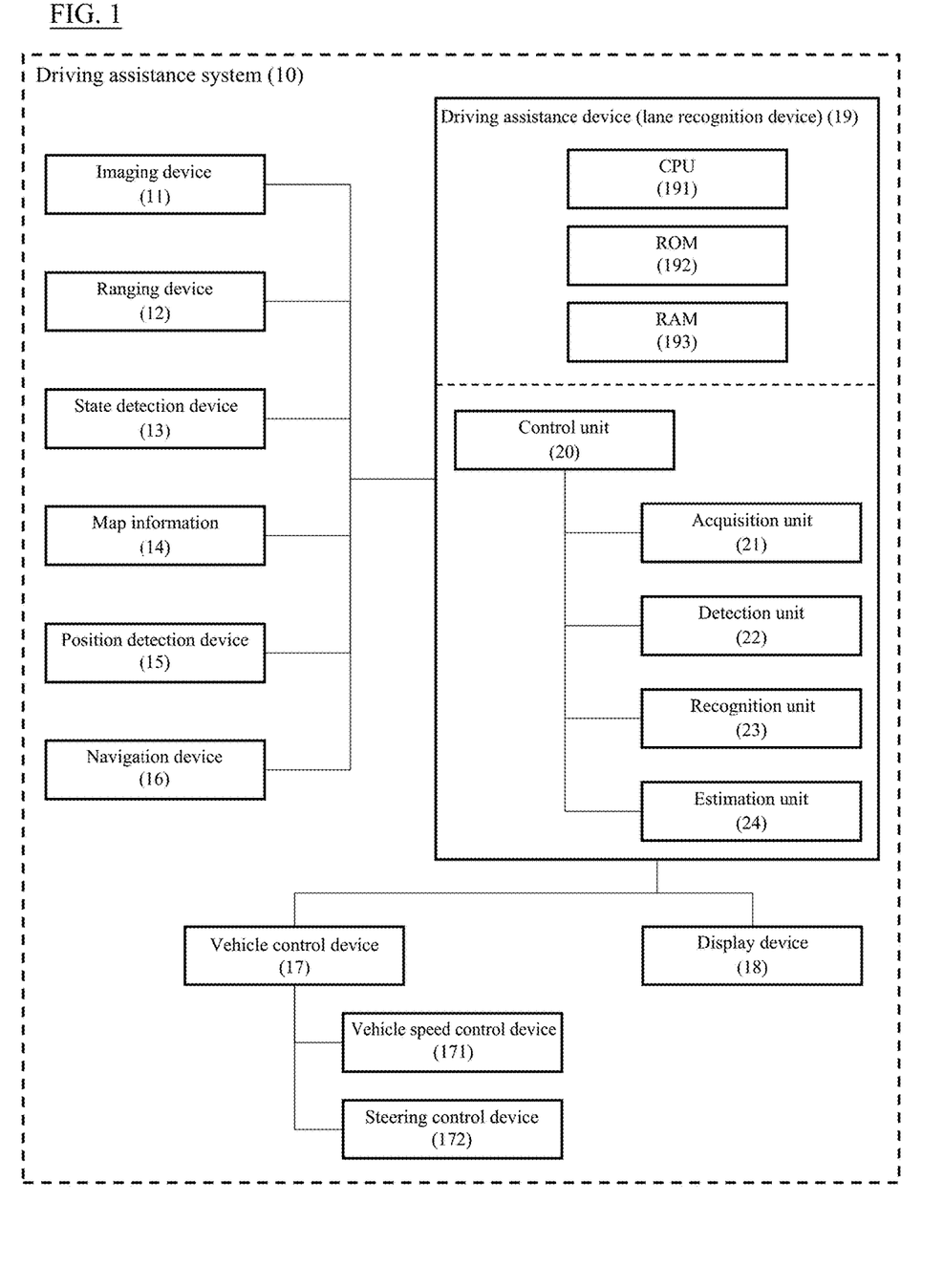
FIG. 1 is a block diagram illustrating a driving assistance system including a driving assistance device according to the present invention.

FIG. 1 is a block diagram illustrating a driving assistance system 10 according to the present invention. The driving assistance system 10 is an onboard system and allows the vehicle to travel to a set destination by using autonomous travel control. The autonomous travel control refers to autonomously controlling the traveling operations of the vehicle using a driving assistance device 19, which will be described later. The traveling operations include all traveling operations such as acceleration, deceleration, starting, stopping, turning to the right or left, changing lanes, and pulling over. Autonomously controlling the traveling operations means that the driving assistance device 19 controls the traveling operations using a device of the vehicle. That is, the driving assistance device 19 intervenes and controls these traveling operations within a predetermined range. Traveling operations that do not require intervention are manually operated by the driver.

The driving assistance system 10 of the present embodiment can correctly recognize the lane in which the vehicle is traveling (also referred to as a "travel lane," hereinafter) when the center line of a road is movable in the width direction of the road on which the vehicle travels (i.e., when the road on which the vehicle travels has reversible lanes). Such a center line that can be moved in the width direction of the road on which the vehicle travels will also be referred to as a "movable center line," hereinafter. When moving the center line in the width direction of the road, the type of line marked on the road surface of a road may be changed. For example, the position of the center line of a road may be moved by switching the solid white line, which has been the center line, to a dashed line and switching one of dashed white lines marked on the road surface to a solid line.

The center line is not limited to a line marked on the road surface of a road, provided that the line can divide the traveling directions of vehicles on the road, and the center line may be an object that prevents a vehicle from changing lanes across the center line. Such objects include structures such as median strips, rectangular or circular objects that serve as barriers for vehicles, etc. Examples of movable center lines include the movable barrier of the Golden Gate Bridge in San Francisco, USA. The movable barrier is a block that can be moved in the width direction of the road using a barrier transfer machine.

As illustrated in FIG. 1, the driving assistance system 10 includes an imaging device 11, a ranging device 12, a state detection device 13, map information 14, a position detection device 15, a navigation device 16, a vehicle control device 17, a display device 18, and a driving assistance device 19. In addition, as illustrated in FIG. 1, the driving assistance device 19 of the present embodiment includes, as a part thereof, a lane recognition device having a lane recognition function. The devices constituting the driving assistance system 10 are connected via a controller area network (CAN) or other onboard LAN and can exchange information with each other.

The imaging device 11 is a device that recognizes objects around the vehicle using images. The imaging device 11 may be, for example, one or more cameras such as cameras including CCDs or other imaging elements, ultrasonic cameras, or infrared cameras. Two or more imaging devices 11 can be provided in one vehicle. For example, such imaging devices 11 may be arranged in the front grille portion of the vehicle, below the right and left door mirrors, and near the rear bumper. This can reduce blind spots when recognizing objects around the vehicle.

The ranging device 12 is a device for calculating the relative distance and relative speed between the vehicle and an object. The ranging device 12 may be, for example, one or more radar devices or sonars, such as laser radars, millimeter wave radars, other similar radars (LRF and the like), light detection and ranging (LiDAR) units, and ultrasonic radars. Two or more ranging devices 12 can be provided in one vehicle. For example, such ranging devices 12 may be arranged at the front, right side, left side, and rear of the vehicle. This allows the relative distance and relative speed between the vehicle and a surrounding object to be calculated accurately.

Objects detected with the imaging device 11 and ranging device 12 are lane boundary lines of roads, center lines, road surface signs, median strips, guardrails, curbstones, highway side walls, road signs, traffic lights, pedestrian crossings, construction sites, accident sites, traffic restrictions, etc. Objects also include obstacles that may affect the travel of the vehicle, such as automobiles (other vehicles) other than the subject vehicle, motorcycles, bicycles, and pedestrians. The detection results of the imaging device 11 and ranging device 12 are acquired by the driving assistance device 19 at predetermined time intervals as necessary.

The detection results of the imaging device 11 and ranging device 12 can be integrated or synthesized by the driving assistance device 19. This can complement missing information about the detected objects. For example, the driving assistance device 19 can calculate the positional information of an object using the self-position information, which represents the position of the vehicle traveling, and the relative position (distance and direction) between the vehicle and the object. The self-position information is acquired by the position detection device 15. The calculated positional information of the object is integrated with multiple information items such as the detection results of the imaging device 11 and ranging device 12 and the map information 14 in the driving assistance device 19 and becomes environmental information around the vehicle. Additionally or alternatively, the detection results of the imaging device 11 and ranging device 12 and the map information 14 can be used to recognize objects around the vehicle and predict their movements.

The state detection device 13 is a device for detecting the traveling state of the vehicle. Examples of the state detection device 13 include a vehicle speed sensor, an acceleration sensor, a yaw rate sensor (e.g., a gyro sensor), a steering angle sensor, and an inertial measurement unit. These devices are not particularly limited, and known devices can be used. The arrangement and number of these devices can be set as appropriate within a range in which the traveling state of the vehicle can be appropriately detected. The detection results of each device are acquired by the driving assistance device 19 at predetermined time intervals as necessary.

The map information 14 is information used for generation of a travel route, control of traveling operations, etc. and includes road information, facility information, and their attribute information. The road information and road attribute information include information on a road width, a radius of curvature of a road, a road shoulder structure, a road traffic regulation (speed limit, whether lane change is permitted), a merging point and a branching point of a road, a position at which the number of lanes increases/decreases, and other similar information. The map information 14 is high-definition map information that allows the movement trajectory for each lane to be perceived, and includes two-dimensional positional information and/or three-dimensional positional information at each map coordinate, road/lane boundary information at each map coordinate, road attribute information, lane inbound/outbound information, lane identification information, connection destination lane information, etc.

The road/lane boundary information of the high-definition map information is information that represents a boundary between the route on which the vehicle travels and another area. The travel route on which the vehicle travels refers to a road for the vehicle to travel, and the form of the travel route is not particularly limited. The boundary exists on each of the right and left sides with respect to the traveling direction of the vehicle, and the form of the boundary is not particularly limited. The boundary is, for example, a road mark or a road structure. Examples of road marks include lane boundary lines and center lines. Examples of road structures include median strips, guardrails, curbstones, tunnels, and highway side walls. At a point at which the travel route boundary cannot be clearly specified, such as inside an intersection, a boundary is preliminarily set on the travel route. This boundary is an imaginary boundary, rather than a road mark or a road structure that actually exists.

The map information 14 is stored in a readable state in a recording medium provided in the driving assistance device 19, an onboard device, or a server on a network. The driving assistance device 19 acquires the map information 14 as necessary.

The position detection device 15 is a positioning system for detecting the current position of the vehicle and is not particularly limited, and a known device can be used. The position detection device 15 calculates the current position of the vehicle, for example, from radio waves or the like received from satellites for a global positioning system (GPS). Additionally or alternatively, the position detection device 15 may estimate the current position of the vehicle from the vehicle speed information and acceleration information acquired from the vehicle speed sensor, the acceleration sensor, and the gyro sensor, which are each the state detection device 13, and cross-check the estimated current position with the map information 14 thereby to calculate the current position of the vehicle.

The navigation device 16 is a device that refers to the map information 14 to calculate a travel route from the current position of the vehicle detected by the position detection device 15 to a destination that is set by occupants (including the driver). The navigation device 16 uses the road information, facility information, etc. of the map information 14 to search for a travel route for the vehicle to reach the destination from the current position. The travel route includes at least information on the road on which the vehicle travels, the travel lane, and the traveling direction of the vehicle, and is displayed, for example, in a linear format. There may be multiple travel routes depending on the search conditions. The travel route calculated by the navigation device 16 is output to the driving assistance device 19.

The vehicle control device 17 is an onboard computer such as an electronic control unit (ECU) and electronically controls onboard equipment that is responsible for the travel of the vehicle. The vehicle control device 17 includes a vehicle speed control device 171 that controls the traveling speed of the vehicle, and a steering control device 172 that controls the steering operation of the vehicle. The vehicle speed control device 171 and the steering control device 172 autonomously control the operations of drive device and steering device in accordance with control signals that are input from the driving assistance device 19. This allows the vehicle to autonomously travel along the set travel route. Information necessary for autonomous control by the vehicle speed control device 171 and the steering control device 172, such as the traveling speed, acceleration, steering angle, and attitude of the vehicle, is acquired from the state detection device 13.

Examples of the drive device controlled by the vehicle speed control device 171 include an electric motor and/or an internal-combustion engine as the traveling drive sources, a power transmission device including a drive shaft and an automatic transmission that transmit the output of the traveling drive sources to the drive wheels, a drive device that controls the power transmission device, etc. The braking device controlled by the vehicle speed control device 171 is, for example, a braking device that brakes the wheels. Control signals corresponding to the set traveling speed are input to the vehicle speed control device 171 from the driving assistance device 19. The vehicle speed control device 171 generates control signals for controlling these components of the drive device based on the control signals that are input from the driving assistance device 19, and transmits the signals to the drive device thereby to autonomously control the traveling speed of the vehicle.

On the other hand, the steering device controlled by the steering control device 172 is a steering device that controls the steered wheels in accordance with the steering angle of the steering wheel, and examples of the steering device include a steering actuator such as a motor attached to a column shaft of the steering wheel. The steering control device 172 autonomously controls the operation of the steering device based on the control signals input from the driving assistance device 19 so that the vehicle travels while maintaining a predetermined lateral position (position in the right-left direction of the vehicle) with respect to the set travel route. This control uses at least one of the detection results of the imaging device 11 and ranging device 12, the traveling state of the vehicle acquired with the state detection device 13, the map information 14, and the information on the current position of the vehicle acquired with the position detection device 15.

The display device 18 is a device for providing necessary information to the occupants of the vehicle. For example, the display device 18 is a liquid crystal display provided on an instrument panel or a projector such as a head-up display (HUD). The display device 18 may include an input device for an occupant of the vehicle to input instructions to the driving assistance device 19. Examples of the input device include a touch panel for inputting with a user's finger or a stylus pen, a microphone for acquiring voice instructions from the user, and a switch attached to the steering wheel of the vehicle. The display device 18 may include a speaker as an output device.

The driving assistance device 19 is a device for controlling the travel of the vehicle by controlling the devices constituting the driving assistance system 10 to cooperate with each other so that the vehicle travels to the set destination. The destination is set, for example, by an occupant of the vehicle. The driving assistance device 19 is, for example, a computer and includes a central processing unit (CPU) 191 that is a processor, a read only memory (ROM) 192 that stores programs, and a random access memory (RAM) 193 that serves as an accessible storage device. The CPU 191 is an operating circuit for achieving the functions of the driving assistance device 19 by executing the programs stored in the ROM 192.

The driving assistance device 19 has a driving assistance function of allowing the vehicle to travel to a set destination using autonomous travel control. In addition, the driving assistance device 19 of the present embodiment has an information acquisition function of acquiring information from devices constituting the driving assistance system 10, a detection function of detecting the movable center line of a road, a recognition function of recognizing the travel lane of the vehicle, and an estimation function of estimating the traveling position of the vehicle. The programs stored in the ROM 192 include those for achieving these functions, and the CPU 191 executes the programs stored in the ROM 192 thereby to achieve these functions. In FIG. 1, each function is extracted and illustrated as a functional block for descriptive purposes.

Functions of Functional Blocks

The functions achieved by a control unit 20, an acquisition unit 21, a detection unit 22, a recognition unit 23, and an estimation unit 24, which are functional blocks, will be described below with reference to FIGS. 2A and 2B.

The control unit 20 has a function of allowing the vehicle to travel to a set destination using the autonomous travel control (i.e., a driving assistance function). FIG. 2A is a plan view illustrating an example of a travel scene in which the driving assistance is being executed by the functions of the control unit 20. In the travel scene illustrated in FIG. 2A, a vehicle V is traveling under the autonomous travel control toward a destination (not illustrated) that is set on the upper side of FIG. 2A. The road illustrated in FIG. 2A is for the right-side traffic, and the vehicle V therefore travels in a direction from the lower side to upper side of FIG. 2A.

Figure 2A:
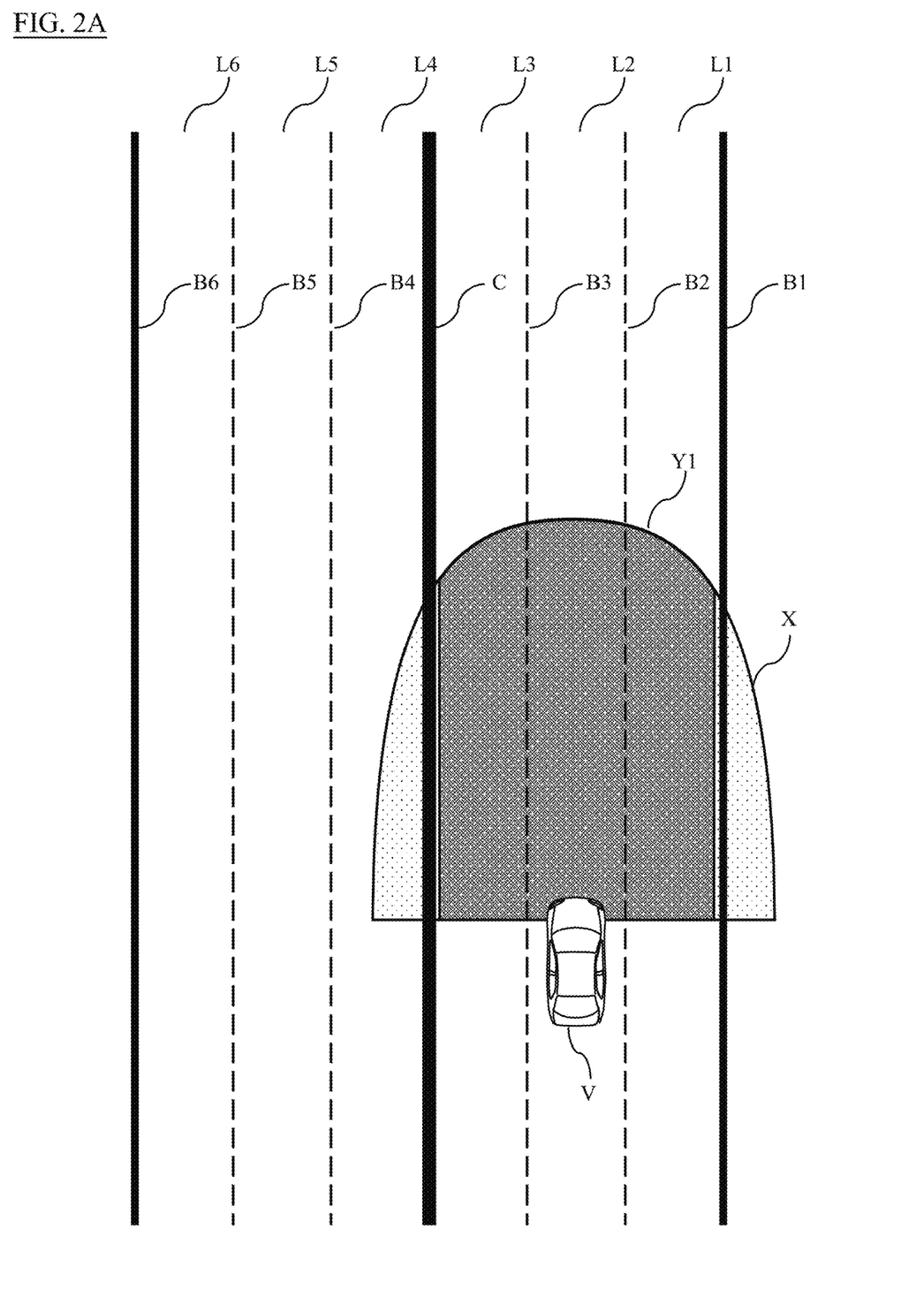
FIG. 2A is a plan view (part 1) illustrating an example of a travel scene in which driving assistance is performed by the driving assistance system illustrated in FIG. 1.

The road illustrated in FIG. 2A is a six-lane road, and the lanes will be referred to as a lane L1, a lane L2, a lane L3, a lane L4, a lane L5, and a lane L6 in order from the right side of the drawing. As illustrated in FIG. 2A, the lane L1 is defined by a boundary B1 and a boundary B2, the lane L2 is defined by the boundary B2 and a boundary B3, the lane L3 is defined by the boundary B3 and a center line C, the lane L4 is defined by the center line C and a boundary B4, the lane L5 is defined by the boundary B4 and a boundary B5, and the lane L6 is defined by the boundary B5 and a boundary B6. In the travel scene illustrated in FIG. 2A, the center line C is located between the lane L3 and the lane L4 and divides the traveling directions of vehicles on the road. The traveling directions in the lanes L1 to L3 are those from the lower side to upper side of FIG. 2A, and the traveling directions in the lanes L4 to L6 are those from the upper side to lower side of FIG. 2A. It is assumed that the center line C illustrated in FIG. 2A is a movable barrier (i.e., a movable center line) and can be moved in the width direction of the road by a barrier transfer machine.

The control unit 20 acquires necessary information from the imaging device 11, the ranging device 12, the state detection device 13, the position detection device 15, etc., and recognizes the environment around the vehicle V. Then, the travel of the vehicle V is autonomously controlled by the vehicle control device 17 (specifically, the vehicle speed control device 171 and the steering control device 172) so that the vehicle V does not come into contact with surrounding obstacles. When recognizing the environment around the vehicle V, the control unit 20 of the present embodiment recognizes the travel lane of the vehicle V by performing cross-check between the boundary information of a boundary dividing lanes (also referred to as "first boundary information," hereinafter), which is acquired from the map information 14, and the boundary information of the boundary dividing the lanes (also referred to as "second boundary information," hereinafter), which is acquired from a detection device of the vehicle V. Recognition of the travel lane is mainly achieved by the functions of the acquisition unit 21, detection unit 22, recognition unit 23, and estimation unit 24.

The acquisition unit 21 has a function of acquiring information from the devices constituting the driving assistance system 10 (i.e., an information acquisition function). The driving assistance device 19 uses the function of the acquisition unit 21 to acquire current position information of the vehicle V, for example, from the position detection device 15. In addition to the radio waves received from the satellites for GPS, the traveling state information (e.g., vehicle speed information and acceleration information) of the vehicle V acquired from the state detection device 13 may be used for calculation of the current position. The driving assistance device 19 then acquires the first boundary information from the map information 14 based on the acquired current position information of the vehicle V.

The first boundary information includes information on a boundary that exists around the current position of the vehicle V and divides lanes. The first boundary information includes, for example, boundary type information and boundary position information. The boundary type information is, for example, information indicating whether the boundary corresponds to a road surface mark or a road structure. Specifically, the boundary type information is information indicating whether the boundary is a road surface mark such as a white line or an object such as a movable barrier. When the boundary is a road surface mark, information on the form of the road surface mark is included. For example, when the boundary is a white line, information indicating whether the white line is a solid line or a dashed line is included.

On the other hand, the boundary position information is information indicating where the boundary is located on the road on which the vehicle V travels. The boundary position information refers, for example, to the positional relationship between boundaries. Specifically, the boundary position information refers to the order in which the boundaries are arranged along the width direction of a road with reference to a boundary that exists on the rightmost side or the leftmost side with respect to the traveling direction of the vehicle V. Alternatively or in addition to this, the boundary position information includes the positional relationship between the current position of the vehicle V and a boundary existing around the current position of the vehicle V.

In addition, information indicating whether or not the center line of a road is a movable center line is preliminarily registered in the map information 14. The driving assistance device 19 can therefore use the function of the acquisition unit 21 to acquire, as the first boundary information, information indicating whether or not the center line of a road on which the vehicle V travels is a movable center line. Although the movable center line can be moved in the width direction of a road, the position of the movable center line registered in the map information 14 is a representative position (e.g., the position at which the movable center line exists for the longest time). In the travel scene illustrated in FIG. 2A, the position of the center line C registered in the map information 14 is located between the boundaries B3 and B4.

Acquisition of the first boundary information in the travel scene illustrated in FIG. 2A will be described. First, the driving assistance device 19 uses the function of the acquisition unit 21 to acquire the position of the vehicle V illustrated in FIG. 2A as the current position information from the position detection device 15. Then, the driving assistance device 19 acquires, from the map information 14, information on boundaries existing around the current position of the vehicle V illustrated in FIG. 2A (first boundary information). In this case, the first boundary information includes information on the boundaries B1 to B6, which are white lines marked on the road surface, and the center line C, which is a movable barrier, as the boundaries existing around the vehicle V. In addition to this, the first boundary information includes the forms of white lines in which the boundaries B1 and B6 are solid lines and the boundaries B2 to B5 are dashed lines. In addition to this, the first boundary information includes the order of boundary arrangement in which the boundaries are arranged in order from the right side of FIG. 2A with reference to the boundary B1 existing on the rightmost side with respect to the traveling direction of the vehicle V such that the boundary B1 which is a solid white line, the boundary B2 which is a dashed white line, the boundary B3 which is a dashed white line, the center line C which is a movable barrier (movable center line), the boundary B4 which is a dashed white line, the boundary B5 which is a dashed white line, and the boundary B6 which is a solid white line are arranged in this order.

The second boundary information will then be described. The driving assistance device 19 uses the function of the acquisition unit 21 to acquire the second boundary information from a detection device of the vehicle V. The detection device of the vehicle Vis, for example, each of the imaging device 11 and the ranging device 12. The driving assistance device 19 recognizes a boundary dividing lanes from the detection results of the imaging device 11 and the ranging device 12. Like the first boundary information, the second boundary information includes information on boundaries existing around the vehicle V (in particular, boundary type information and boundary position information).

The boundary type information can be acquired, for example, from an image obtained by the imaging device 11. As an example, the driving assistance device 19 recognizes a boundary through acquiring an image captured ahead of the vehicle V from the imaging device 11, performing edge detection processing on the acquired image, and performing pattern matching on the image subjected to the edge detection processing. This allows the information indicating whether the boundary corresponds to a road surface mark or a road structure to be acquired as the second boundary information. When the recognized boundary is a line marked on the road surface, the driving assistance device 19 identifies whether the line is a solid line or a dashed line. This also allows the information on the form of road surface mark to be obtained.

As another example, the driving assistance device 19 acquires the boundary type information from the detection results of the ranging device 12. For example, the driving assistance device 19 acquires information on the shape of an obstacle existing around the vehicle V and the distance from the vehicle V to the obstacle from the detection results of radar and/or LiDAR. Then, the driving assistance device 19 determines whether the obstacle corresponds to a road structure (such as a median strip, a guardrail, or a curbstone on the road shoulder) from the information on the shape of the obstacle and the information on the distance to the obstacle.

On the other hand, the boundary position information is obtained, for example, by integrating the detection results of the imaging device 11 and the detection results of the ranging device 12. As an example, the driving assistance device 19 performs image processing such as pattern matching on an image acquired from the imaging device 11 and recognizes the type of a boundary existing around the vehicle V from the feature of an object, such as its shape. The driving assistance system 10 then detects the distance to the boundary existing around the vehicle V and the position of the boundary with reference to the position of the vehicle V from the detection results of the ranging device 12 (e.g., radar). This allows the boundary type information, the distance from the vehicle V to the boundary, and the boundary position information to be acquired as the second boundary information.

When recognizing the type of boundary from the detection results of the imaging device 11 and the ranging device 12, the driving assistance device 19 determines whether or not the boundary is the center line of a road on which the vehicle V travels. Then, when recognizing that the boundary is the center line, the driving assistance device 19 determines whether or not the boundary is movable in the width direction of the road (i.e., whether or not the boundary is a movable center line). Specifically, the shape of an object corresponding to the movable center line is preliminarily registered in a program, and when performing pattern matching on an image acquired from the imaging device 11, the driving assistance device 19 determines whether or not an object having the registered shape is included. Alternatively or in addition to this, the driving assistance device 19 determines whether or not the shape of an obstacle obtained from the detection results of the radar and/or LiDAR (ranging device 12) matches the shape of a movable center line that is preliminarily registered. This allows the driving assistance device 19 to acquire information indicating whether or not a movable center line exists around the vehicle V as the second boundary information.

The acquisition of the second boundary information in the travel scene illustrated in FIG. 2A will be described. First, the driving assistance device 19 uses the function of the acquisition unit 21 to acquire the detection results of the imaging device 11 and ranging device 12. Assuming that the range in which the imaging device 11 and the ranging device 12 can detect an object is a detection area X illustrated in FIG. 2A, the driving assistance device 19 performs image processing such as edge detection and pattern matching on the image acquired from the imaging device 11 and recognizes the boundaries B1 to B3 which are white lines marked on the road surface. In addition, the driving assistance device 19 recognizes that the boundary B1 is a solid line and the boundaries B2 and B3 are dashed lines as the forms of the white lines. Furthermore, the driving assistance device 19 recognizes the center line C existing on the left side of the vehicle V from the above-described pattern matching.

Then, the driving assistance device 19 detects the distance from the vehicle V to the center line C and the position of the center line C with respect to the vehicle V from the detection results of the radar and/or LiDAR (ranging device 12). In this case, the positional information of the center line C includes, for example, the center line C existing on the left side of the vehicle V. In addition to this, the driving assistance device 19 determines whether or not the recognized center line C is a movable center line. In the travel scene illustrated in FIG. 2A, since the center line C is a movable barrier, the center line C is determined to be a movable center line. The driving assistance device 19 acquires these information items as the second boundary information.

In addition, the driving assistance device 19 acquires the order of boundary arrangement as in the case of the first boundary information based on the distance from the vehicle V to the center line C and the directions in which the boundaries B1 to B3 and the center line C are located with respect to the vehicle V. In the travel scene of FIG. 2A, the boundary B1 which is a solid white line and the boundary B2 which is a dashed white line are arranged on the right side of the vehicle while the boundary B3 which is a dashed white line and the center line C which is a movable barrier are arranged on the left side of the vehicle. The driving assistance device 19 therefore recognizes that the boundary B1 which is a solid white line, the boundary B2 which is a dashed white line, the vehicle V, the boundary B3 which is a dashed white line, and the center line C which is a movable barrier are arranged in order from the right side of FIG. 2A on the right side in the traveling direction of the vehicle V with reference to the boundary B1 existing at the farthest position from the vehicle V. The difference from the order of boundary arrangement in the first boundary information is that the position of the vehicle V is included in the order of arrangement. The driving assistance device 19 acquires the order of arrangement as the second boundary information.

When acquiring the second boundary information in the travel scene of FIG. 2A, the driving assistance device 19 uses the function of the control unit 20 to recognize a travelable area Y1 as an area in which the vehicle V can travel without contacting an obstacle. The travelable area Y1 is an area of the detection area X that is surrounded by the boundary B1 and the center line C. The driving assistance device 19 uses the vehicle control device 17 to autonomously control the travel of the vehicle V so that the vehicle V travels within the travelable area Y1.

The detection unit 22 has a function of detecting the movable center line of a road (i.e., a detection function). The driving assistance device 19 uses the function of the detection unit 22 to detect the movable center line from at least one of the first boundary information and the second boundary information. As described above, the first boundary information and the second boundary information include information indicating whether or not the center line of the road on which the vehicle V travels is a movable center line. The driving assistance device 19 can therefore detect the movable center line based on the first boundary information and the second boundary information.

For example, in the travel scene illustrated in FIG. 2A, the driving assistance device 19 detects, based on the first boundary information, a movable barrier (center line C) on the road on which the vehicle V travels. Alternatively or in addition to this, the driving assistance device 19 detects, based on the second boundary information, a movable barrier (center line C) existing on the left side of the vehicle V.

The detection unit 22 also has a function of determining whether or not the position of the movable center line is within an adjacent lane to the travel lane in which the vehicle V travels, when the movable center line is detected from the second boundary information. Specifically, the detection unit 22 extracts two boundaries defining the travel lane of the vehicle V from the second boundary information and obtains the distances between the two extracted boundaries and the movable center line. The distances are those along the width direction of the road on which the vehicle V travels. Then, when one of the obtained distances is smaller than the width of one lane of the road on which the vehicle V travels, a determination is made that the position of the movable center line is within the adjacent lane to the lane on which the vehicle V travels. In contrast, when the two obtained distances are both larger than or equal to the width of one lane of the road on which vehicle V travels, a determination is made that the position of the movable center line is not within the adjacent lane to the lane on which vehicle V travels.

The above-described determination will be specifically described using the travel scene illustrated in FIG. 2A. First, the driving assistance device 19 extracts, from the second boundary information, the boundaries B2 and B3 defining the lane L2 in which the vehicle V travels. Then, the driving assistance device 19 obtains the distances between the boundaries B2 and B3 and the movable barrier (center line C). Since the movable barrier is a block and is wider than the line marked on the road surface, the distance between the boundary B3 and the movable barrier (center line C) is smaller than the width of the lane L3. In the travel scene illustrated in FIG. 2A, therefore, a determination is made that the position of the movable barrier (movable center line) is within the lane L3 which is the adjacent lane to the lane L2 in which vehicle V travels.

The detection unit 22 further has a function of determining whether or not a boundary of the travel lane in which the vehicle V travels is the movable center line. Specifically, the detection unit 22 extracts two boundaries defining the travel lane of the vehicle V from the second boundary information and determines whether or not one of the two extracted boundaries is the movable center line. When one of the two extracted boundaries is the movable center line, a determination is made that the boundary of the travel lane in which vehicle V travels is the movable center line. In contrast, when neither of the two extracted boundaries is the movable center line, a determination is made that the boundary of the lane in which vehicle V travels is not the movable center line.

For example, in the travel scene illustrated in FIG. 2A, the boundaries defining the lane L2 in which the vehicle V travels are extracted from the second boundary information as the boundaries B2 and B3. A determination is therefore made that the boundary of the lane L2 in which the vehicle V travels is not the movable center line.

The recognition unit 23 has a function of recognizing the travel lane of the vehicle (i.e., a recognition function). The driving assistance device 19 uses the function of the recognition unit 23 to cross-check the first boundary information and the second boundary information to recognize the travel lane of the vehicle V. This allows the travel lane of the vehicle V to be recognized more accurately.

When cross-checking the first boundary information and the second boundary information, for example, the type of boundary included in the first boundary information and the type of boundary included in the second boundary information are compared with each other in order from the right or left side with respect to the traveling direction of the vehicle V. Specifically, the comparison is started from the boundary existing on the rightmost side or leftmost side with respect to the traveling direction of the vehicle V, and the boundaries included in the second boundary information are compared until reaching the position of the vehicle V. The comparison of boundaries is performed only on either the right or left side in the traveling direction of the vehicle V, but may also be performed on both the right and left sides.

The comparison of boundaries will be described using the travel scene illustrated in FIG. 2A. In the travel scene illustrated in FIG. 2A, the order of boundary arrangement in the first boundary information is such that the boundary B1 which is a solid white line, the boundary B2 which is a dashed white line, the boundary B3 which is a dashed white line, the center line C which is a movable barrier, the boundary B4 which is a dashed white line, the boundary B5 which is a dashed white line, and the boundary B6 which is a solid white line are arranged in this order with reference to the boundary B1 existing on the rightmost side with respect to the traveling direction of the vehicle V. On the other hand, the order of boundary arrangement in the second boundary information is such that the boundary B1 which is a solid white line, the boundary B2 which is a dashed white line, the vehicle V, the boundary B3 which is a dashed white line, and the center line C which is a movable barrier are arranged in this order on the right side in the traveling direction of the vehicle V with reference to the boundary B1 existing at the farthest position from the vehicle V.

In this case, when the boundary type information of the first boundary information and the boundary type information of the second boundary information are compared with each other, the order of arrangement of the boundary B1 which is a solid white line and the boundary B2 which is a dashed white line matches on the right side of the vehicle V. In addition, the order of arrangement of the boundary B3 which is a dashed white line and the center line C which is a movable barrier matches on the left side of the vehicle V. On the basis of this comparison result, a lane with matching order of boundary arrangement on each of the right and left sides of the vehicle V is searched for. In the travel scene illustrated in FIG. 2A, when the vehicle V is traveling in the lane L2, the order of boundary arrangement matches on the right side of the vehicle V. The driving assistance device 19 therefore recognizes that the travel lane of the vehicle V is the lane L2. The driving assistance device 19 outputs to the display device 18 that the recognized travel lane is the lane L2.

The recognition unit 23 also has a function of correcting the initially estimated travel lane when it is different from the travel lane recognized as a result of the cross-check. The driving assistance device 19 uses the function of the recognition unit 23 to calculate a correction amount for correcting the travel lane and uses the calculated correction amount to correct the initially estimated travel lane. The initially estimated travel lane is corrected to match the travel lane recognized as a result of the cross-check. The correction amount for correcting the travel lane is equal to the distance for moving from the initially estimated travel lane to the travel lane recognized as a result of the cross-check along the width direction of the road on which the vehicle V travels. For example, in the travel scene illustrated in FIG. 2A, if the width of one lane is 3.5 m and the initially estimated lane is the lane L4, the calculated correction amount is 3.5×2=7 (m). The corrected travel lane is output to the display device 18.

The recognition unit 23 of the present embodiment has a function of not performing cross-check between the first boundary information and the second boundary information on one of the right side and left side of the vehicle V on which the movable center line is detected, when the movable center line is detected by the detection unit 22. This suppresses erroneous recognition of the travel lane of the vehicle V. This function will be described below with reference to FIG. 2B.

Figure 2B:
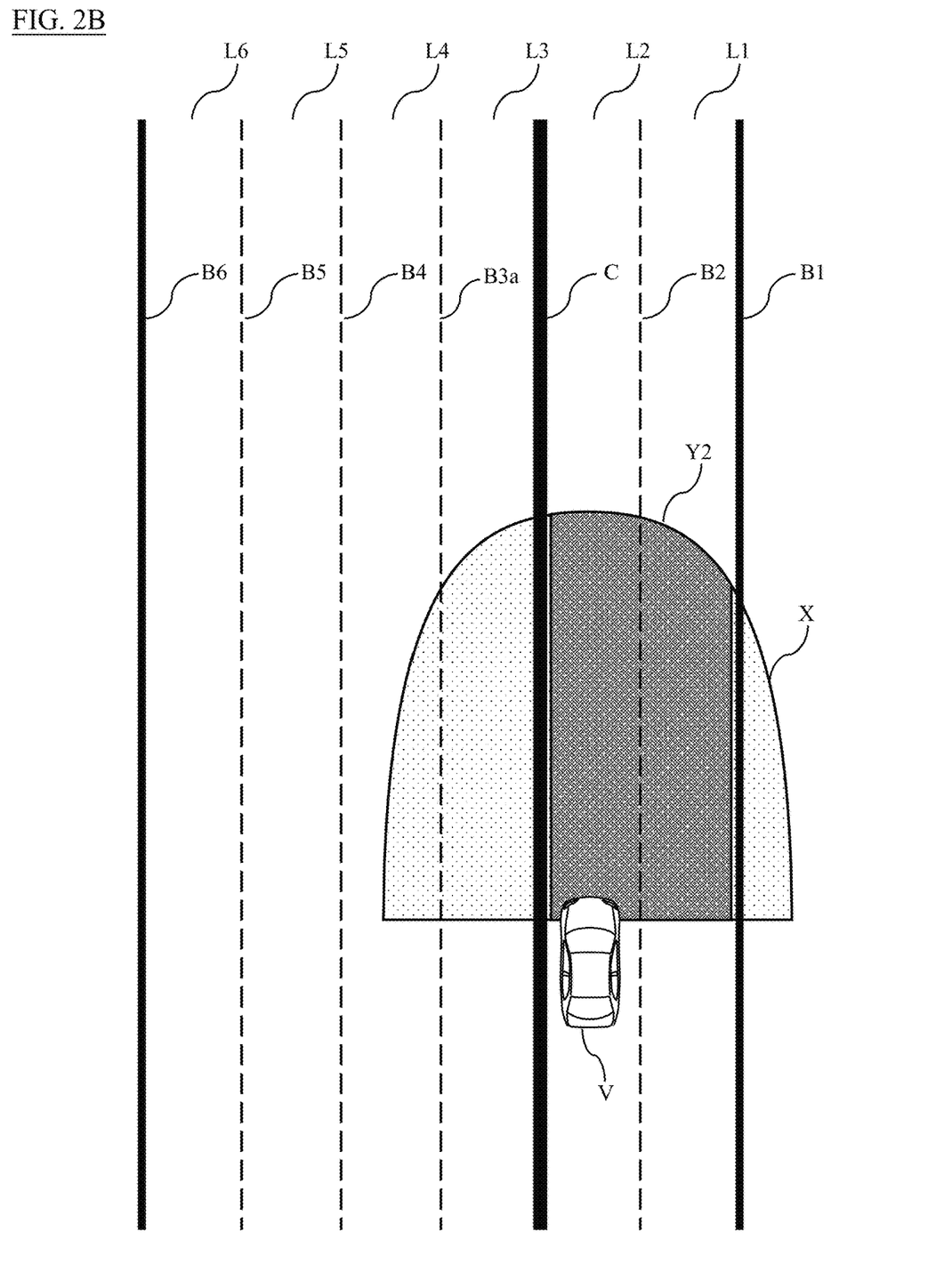
FIG. 2B is a plan view (part 2) illustrating an example of a travel scene in which driving assistance is performed by the driving assistance system illustrated in FIG. 1.

The travel scene illustrated in FIG. 2B is a scene in which the center line C, which is a movable barrier, is moved to the right side with respect to the traveling direction of the vehicle V in the travel scene illustrated in FIG. 2A. In the travel scene illustrated in FIG. 2B, the vehicle V is traveling in the lane L2 as in the travel scene illustrated in FIG. 2A. However, the center line C is located between the lanes L2 and L3 rather than between the lanes L3 and L4. The traveling directions in the lanes L1 to L2 are therefore from the lower side to the upper side in FIG. 2A while the traveling directions in the lanes L3 to L6 are from the upper side to the lower side in FIG. 2A. The boundaries of the lanes are different from those in the travel scene illustrated in FIG. 2A in that the lane L2 is defined by the boundary B2 and the center line C, the lane L3 is defined by the center line C and a boundary B3a, and the lane L4 is defined by the boundary B3a and the boundary B4.

In this case, the first boundary information acquired by the driving assistance device 19 is the same as that in the travel scene illustrated in FIG. 2A. This is because the position of the movable center line registered in the map information 14 is only a representative position, and the position of the movable barrier moved from the representative position cannot be acquired from the map information 14. In contrast, the second boundary information acquired by the driving assistance device 19 is different from that in the travel scene illustrated in FIG. 2A. This is because the imaging device 11 and the ranging device 12 can detect the position of the movable barrier after it has been moved.

The acquisition of the second boundary information in the travel scene illustrated in FIG. 2B will be described. First, the driving assistance device 19 uses the function of the acquisition unit 21 to acquire the detection results of the imaging device 11 and ranging device 12 in the detection area X illustrated in FIG. 2B. The driving assistance device 19 recognizes the boundaries B1, B2, and B3a, which are white lines marked on the road surface, from the image acquired from the imaging device 11. In addition, the driving assistance device 19 recognizes that the boundary B1 is a solid line and the boundaries B2 and B3a are dashed lines as the forms of the white lines. Furthermore, the driving assistance device 19 recognizes the center line C existing on the left side of the vehicle V.

Then, the driving assistance device 19 detects the distance from the vehicle V to the center line C and the position of the center line C with respect to the vehicle V from the detection results of the ranging device 12 (such as radar). In this case, the positional information of the center line C includes the center line C existing on the left side of the vehicle V. In addition to this, the driving assistance device 19 determines whether or not the recognized center line C is a movable center line. In the travel scene illustrated in FIG. 2B, since the center line C is a movable barrier, the center line C is determined to be a movable center line. The driving assistance device 19 acquires these information items as the second boundary information.

In addition, the driving assistance device 19 acquires the order of boundary arrangement based on the distance from the vehicle V to the center line C and the directions in which the boundaries B1 to B3a and the center line C are located with respect to the vehicle V. In the travel scene of FIG. 2B, the center line C is located between the lanes L2 and L3, and the driving assistance device 19 therefore recognizes that the boundary B1 which is a solid white line, the boundary B2 which is a dashed white line, the vehicle V, the center line C which is a movable barrier, and the boundary B3a which is a dashed white line are arranged in order from the right side of FIG. 2A with reference to the boundary B1. The driving assistance device 19 acquires the order of arrangement as the second boundary information.

When acquiring the second boundary information in the travel scene of FIG. 2B, the driving assistance device 19 uses the function of the control unit 20 to recognize a travelable area Y2 as an area in which the vehicle V can travel without contacting an obstacle. The travelable area Y2 is an area of the detection area X that is surrounded by the boundary B1 and the center line C. Unlike the travel scene illustrated in FIG. 2A, the vehicle V cannot travel in the lane L3 in the travel scene illustrated in FIG. 2B, and the travelable area Y2 illustrated in FIG. 2B is therefore narrower than the travelable area Y1 by the width of the lane L3.

The comparison of boundaries in the travel scene illustrated in FIG. 2B will be described. In the travel scene illustrated in FIG. 2B, as in the travel scene illustrated in FIG. 2A, the order of boundary arrangement in the first boundary information is such that the boundary B1 which is a solid white line, the boundary B2 which is a dashed white line, the boundary B3 which is a dashed white line, the center line C which is a movable barrier, the boundary B4 which is a dashed white line, the boundary B5 which is a dashed white line, and the boundary B6 which is a solid white line are arranged in this order with reference to the boundary B1. On the other hand, the order of boundary arrangement in the second boundary information is such that the boundary B1 which is a solid white line, the boundary B2 which is a dashed white line, the vehicle V, the center line C which is a movable barrier, and the boundary B3a which is a dashed white line are arranged in this order with reference to the boundary B1.

In this case, when the boundary type information of the first boundary information and the boundary type information of the second boundary information are compared with each other, the order of arrangement of the boundary B1 which is a solid white line and the boundary B2 which is a dashed white line matches on the right side of the vehicle V. In contrast, the order of boundary arrangement does not match on the left side of the vehicle V. That is, in the first boundary information, the boundaries are arranged such that the boundary B3 which is a dashed white line and the center line C which is a movable barrier are located in order from the right side with respect to the traveling direction of the vehicle V, but in the second boundary information, the boundaries are arranged such that the center line C which is a movable barrier and the boundary B3a which is a dashed white line are located in order from the right side.

After searching for a lane with matching order of boundary arrangement based on the comparison result on the right side of vehicle V, the lane L2 is recognized as the travel lane of the vehicle V as in the travel scene illustrated in FIG. 2A. On the other hand, in the comparison result on the left side of vehicle V, the order of boundary arrangement in the first boundary information does not match the order of boundary arrangement in the second boundary information, so a lane with matching order of boundary arrangement cannot be searched for, and the travel lane of the vehicle V cannot be accurately recognized. If the travel lane of the vehicle V cannot be accurately recognized, the travel lane displayed on the display device 18 will be different from the lane in which the vehicle V is actually traveling, thus giving uncomfortable feeling to the occupants. In addition, inaccurate recognition of the travel lane leads to generation of an inaccurate travel route by the navigation device 16. When a movable center line is detected by the detection unit 22, therefore, the driving assistance device 19 does not perform the cross-check between the first boundary information and the second boundary information on one of the right and left sides of the vehicle V on which the movable center line is detected (the left side in the travel scene illustrated in FIG. 2B), and performs the cross-check between the first boundary information and the second boundary information on the opposite side to the side on which the movable center line is detected (the right side in the travel scene illustrated in FIG. 2B).

The recognition unit 23 has a function of restarting the cross-check between the first boundary information and the second boundary information on the side on which the movable center line is no longer detected when the movable center line is no longer detected after the movable center line is detected as in the travel scenes illustrated in FIGS. 2A and 2B. For example, in the travel scene illustrated in FIG. 2B, when the movable barrier located on the left side of the vehicle V is no longer detected, the driving assistance device 19 restarts the cross-check between the first boundary information and the second boundary information on the left side of the vehicle V.

In addition, the recognition unit 23 has a function of not performing the cross-check between the first boundary information and the second boundary information on the side on which the movable center line is detected when the function of the detection unit 22 is used to determine that the position of the movable center line is within an adjacent lane to the travel lane of the vehicle V. The recognition unit 23 also has a function of not performing the cross-check between the first boundary information and the second boundary information on the side on which the movable center line is detected when the function of the detection unit 22 is used to determine that the movable center line is a boundary of the travel lane of the vehicle V.

However, when a determination is made that the position of the movable center line is not within the adjacent lane and the movable center line is not the boundary of the travel lane of vehicle V, the cross-check between the first boundary information and the second boundary information may be exceptionally performed on the side on which the movable center line is detected. For example, in the travel scene illustrated in FIG. 2B, when the movable barrier (center line C) is located between the lanes L5 and L6, the driving assistance device 19 can perform the cross-check between the first boundary information and the second boundary information on the left side of the vehicle V. This is because if the positions of the vehicle V and movable center line are far apart, the influence on the cross-check between the first boundary information and the second boundary information will not be so large.

The estimation unit 24 has a function of estimating the traveling position of the vehicle (i.e., an estimation function). The driving assistance device 19 uses the function of the recognition unit 23 to recognize the travel lane of the vehicle V and then uses the function of the estimation unit 24 to acquire the traveling state information of the vehicle V from the state detection device 13. Examples of the traveling state information include vehicle speed information, acceleration information, yaw rate information, and steering angle information. Then, the driving assistance device 19 calculates an amount of movement of the vehicle V from the traveling state information and calculates a predicted position of the vehicle V from the calculated amount of movement. Then, the predicted position of the vehicle Vis cross-checked with the map information 14 and the current position information, and the current position is updated using the cross-checked predicted position. The updated current position information is output to the display device 18.

Processing in Driving Assistance System

Figure 3A:
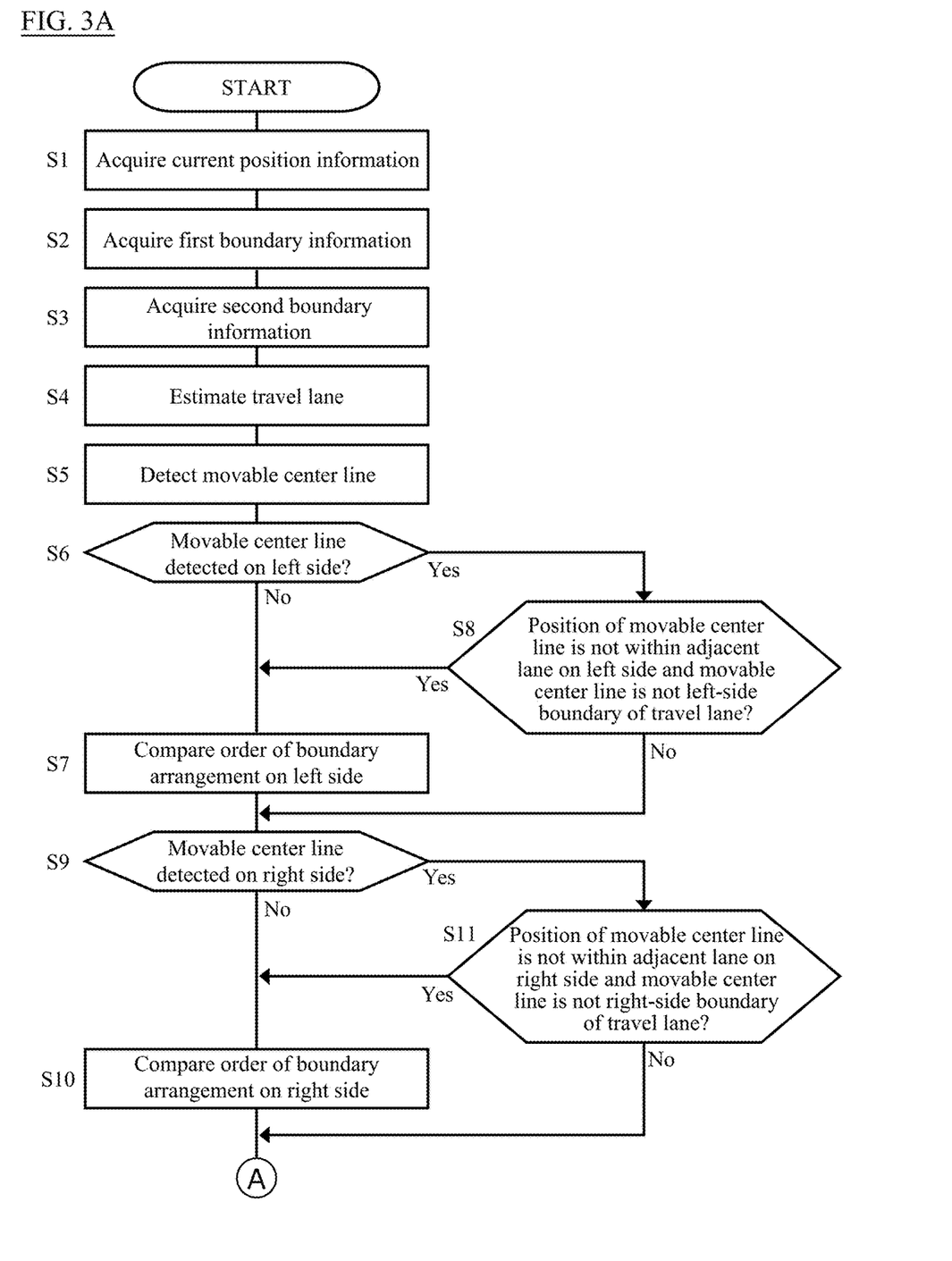
FIG. 3A is a flowchart (part 1) illustrating an example of a processing procedure in the driving assistance system of FIG. 1.
Figure 3B:
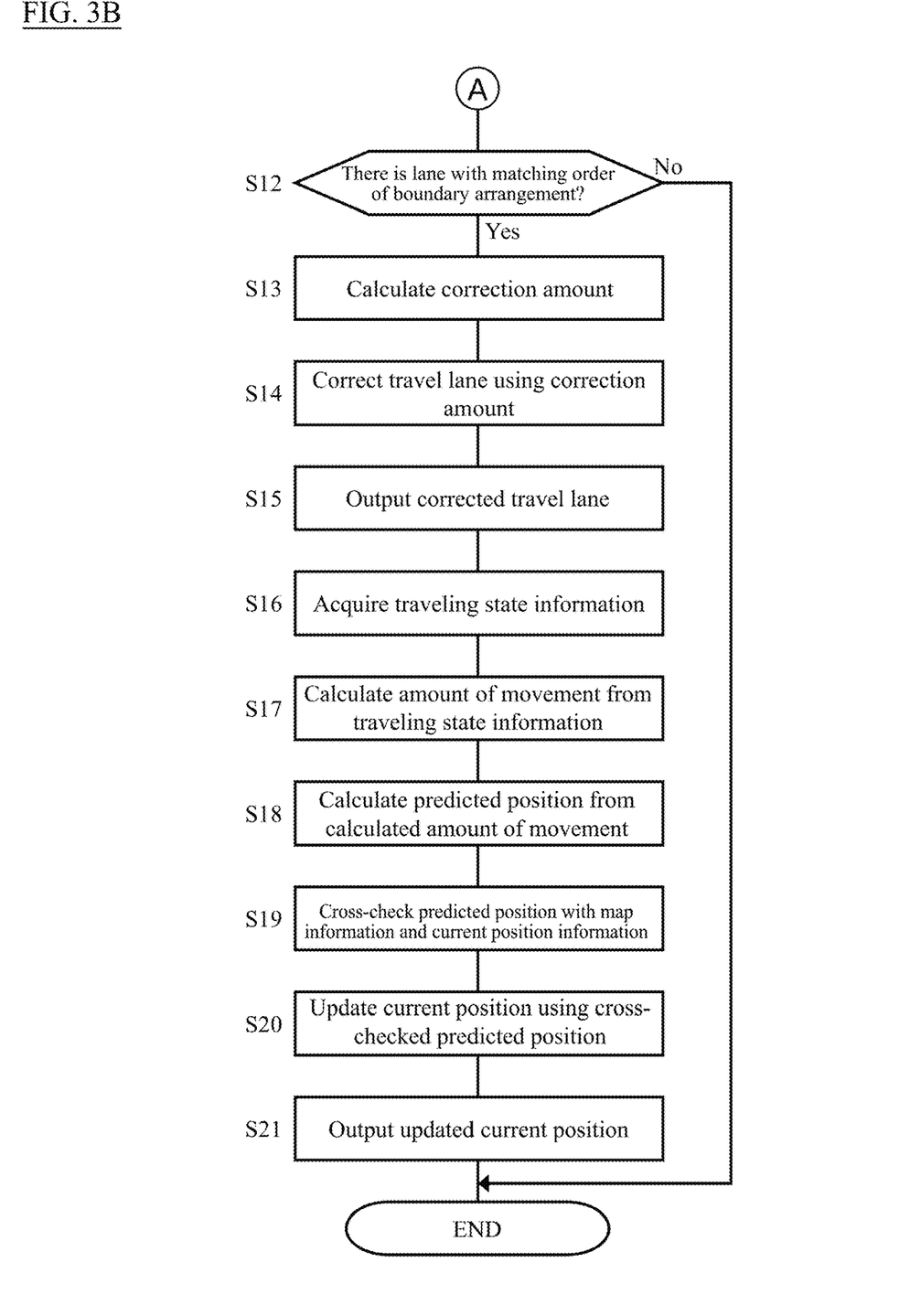
FIG. 3B is a flowchart (part 2) illustrating an example of a processing procedure in the driving assistance system of FIG. 1.

A procedure when the driving assistance device 19 processes information will be described with reference to FIGS. 3A and 3B. FIGS. 3A and 3B are an example of a flowchart illustrating information processing executed in the driving assistance system 10 of the present embodiment. The processing described below is executed at predetermined time intervals by the CPU 191, which is a processor of the driving assistance device 19.

First, in step S1, the function of the acquisition unit 21 is used to acquire the current position information of the vehicle V from the position detection device 15. In subsequent step S2, the first boundary information is acquired from the map information 14, and in step S3, the second boundary information is acquired from the imaging device 11 and the ranging device 12. Then, in step S4, the function of the recognition unit 23 is used to estimate the travel lane of the vehicle V using the first boundary information and/or the second boundary information.

In step S5, the function of the detection unit 22 is used to detect a movable center line existing on the right or left side of the vehicle V from the first boundary information and/or the second boundary information. In subsequent step S6, a determination is made whether or not a movable center line is detected on the left side of the vehicle V. When a determination is made that a movable center line is not detected on the left side of the vehicle V, the process proceeds to step S7, in which the function of the recognition unit 23 is used to compare the order of boundary arrangement in the first boundary information and the second boundary information on the left side of the vehicle V. On the other hand, when a determination is made that a movable center line is detected on the left side of the vehicle V, the process proceeds to step S8. In step S8, the function of the detection unit 22 is used to determine whether the position of the movable center line is not within the adjacent lane on the left side of the vehicle V and the movable center line is not the left-side boundary of the travel lane of the vehicle V. When a determination is made that the position of the movable center line is not within the adjacent lane on the left side of the vehicle V and the movable center line is not the left-side boundary of the travel lane of the vehicle V, the process proceeds to step S7, in which the order of boundary arrangement in the first boundary information and the second boundary information is compared on the left side of the vehicle V. On the other hand, when a determination is made that the position of the movable center line is within the adjacent lane on the left side of the vehicle V or the movable center line is the left-side boundary of the travel lane of the vehicle V, the process proceeds to step S9 without performing cross-check between the first boundary information and the second boundary information on the left side of the vehicle V.

In step S9, a determination is made whether or not a movable center line is detected on the right side of the vehicle V. When a determination is made that a movable center line is not detected on the right side of the vehicle V, the process proceeds to step S10, in which the function of the recognition unit 23 is used to compare the order of boundary arrangement in the first boundary information and the second boundary information on the right side of the vehicle V. On the other hand, when a determination is made that a movable center line is detected on the right side of the vehicle V, the process proceeds to step S11. In step S11, the function of the detection unit 22 is used to determine whether the position of the movable center line is not within the adjacent lane on the right side of the vehicle V and the movable center line is not the right-side boundary of the travel lane of the vehicle V. When a determination is made that the position of the movable center line is not within the adjacent lane on the right side of the vehicle V and the movable center line is not the right-side boundary of the travel lane of the vehicle V, the process proceeds to step S12, in which the order of boundary arrangement in the first boundary information and the second boundary information is compared on the right side of the vehicle V. On the other hand, when a determination is made that the position of the movable center line is within the adjacent lane on the right side of the vehicle V or the movable center line is the right-side boundary of the travel lane of the vehicle V, the process proceeds to step S12 without performing cross-check between the first boundary information and the second boundary information on the right side of the vehicle V.

In step S12, the function of the recognition unit 23 is used to determine whether or not there is a lane with matching order of boundary arrangement on the assumption that the lane is the travel lane of the vehicle V. In the determination in step S12, it is sufficient that the order of boundary arrangement matches on either the right side or left side of the vehicle V, and it is not necessary that the order of boundary arrangement matches on both the right side and left side of the vehicle V. When a determination is made that there is not a lane with matching order of boundary arrangement, the driving assistance by the driving assistance device 19 is terminated because the travel lane of the vehicle V cannot be accurately recognized. At this time, the display device 18 is used to request the driver to perform a manual driving operation. On the other hand, when a determination is made that there is a lane with matching order of boundary arrangement, the process proceeds to step S13.

In step S13, the function of the recognition unit 23 is used to calculate a correction amount for making the travel lane estimated in step S4 match the travel lane recognized in step S12. In subsequent step S14, the travel lane estimated in step S4 is corrected using the correction amount calculated in step S13. In subsequent step S15, the corrected travel lane is outputted to the display device 18 as the travel lane of the vehicle V.

In step S16, the function of the estimation unit 24 is used to acquire the traveling state information (e.g., vehicle speed information, acceleration information, and yaw rate information) of the vehicle V. In subsequent step S17, the amount of movement of the vehicle V is calculated from the traveling state information, and in step S18, the predicted position of the vehicle V is calculated from the calculated amount of movement. In subsequent step S19, the predicted position of the vehicle V is cross-checked with the map information 14 and the current position information, and in step S20, the current position is updated using the cross-checked predicted position. Then, in step S21, the updated current position information is output to the display device 18.

Embodiments of Present Invention

As described above, according to the present embodiment, there is provided a lane recognition method for recognizing a travel lane of a vehicle V by using a processor to perform cross-check between first boundary information about a boundary dividing lanes and second boundary information about the boundary dividing the lanes. The first boundary information is acquired from map information 14. The second boundary information is acquired from a detection device of the vehicle V. The processor detects a movable center line from at least one of the first boundary information and the second boundary information. The movable center line is a center line C that can move in a width direction of a road on which the vehicle V travels. When the movable center line is detected, the processor does not perform the cross-check between the first boundary information and the second boundary information on one of a right side and a left side of the vehicle V on which the movable center line is detected. Through this operation, when the vehicle V is traveling on a road on which the position of the center line moves, it is possible to suppress erroneous recognition of the traveling position of the vehicle V.

In addition, according to the lane recognition method of the present embodiment, when the movable center line is no longer detected after the movable center line is detected, the processor restarts the cross-check on a side on which the movable center line is no longer detected. This allows the cross-check between the first boundary information and the second boundary information to be controlled in accordance with the state of the road on which the vehicle V travels.

Moreover, according to the lane recognition method of the present embodiment, when the movable center line is detected from the second boundary information, the processor determines whether or not a position of the movable center line is within an adjacent lane to the travel lane and whether or not the movable center line is the boundary of the travel lane. When determining that the position of the movable center line is within the adjacent lane or determining that the movable center line is the boundary of the travel lane, the processor does not perform the cross-check on the side on which the movable center line is detected. When determining that the position of the movable center line is not within the adjacent lane and determining that the movable center line is not the boundary of the travel lane, the processor performs the cross-check on the side on which the movable center line is detected. Through this operation, when the detected movable center line does not have a large influence on the cross-check between the first boundary information and the second boundary information, the cross-check between the first boundary information and the second boundary information can be performed on both the right side and the left side of the vehicle V. As a result, even when the vehicle V is traveling on a road on which a movable center line exists, erroneous recognition of the traveling position of the vehicle V can be suppressed.

Furthermore, according to the lane recognition method of the present embodiment, when the movable center line is detected, the processor performs the cross-check on a side opposite to the side on which the movable center line is detected. Through this operation, when the vehicle V is traveling on a road on which a movable center line is arranged, the cross-check between the first boundary information and the second boundary information is performed on either the right side or left side of the vehicle V, and erroneous recognition of the traveling position of the vehicle V can therefore be further suppressed.

In addition, according to the lane recognition method of the present embodiment, the first boundary information includes a type of the boundary of the lanes on the road on which the vehicle V travels, the second boundary information includes the type of the boundary of the lanes detected by the detection device, and when performing the cross-check, the processor compares the type of the boundary included in the first boundary information with the type of the boundary included in the second boundary information sequentially from the right side or left side with respect to a traveling direction of the vehicle V. This allows the cross-check between the first boundary information and the second boundary information to be performed more accurately.

Moreover, according to the present embodiment, there is provided a lane recognition device comprising: a recognition unit 23 that recognizes a travel lane for a vehicle V by performing cross-check between first boundary information about a boundary dividing lanes and second boundary information about the boundary dividing the lanes, the first boundary information being acquired from map information 14, the second boundary information being acquired from a detection device of the vehicle V; and a detection unit 22 that detects a movable center line from at least one of the first boundary information and the second boundary information, the movable center line being a center line C that can move in a width direction of a road on which the vehicle V travels, wherein when the movable center line is detected by the detection unit 22, the recognition unit 23 does not perform the cross-check between the first boundary information and the second boundary information on one of a right side and a left side of the vehicle on which the movable center line is detected. Through this operation, when the vehicle V is traveling on a road on which the position of the center line moves, it is possible to suppress erroneous recognition of the traveling position of the vehicle V.

DESCRIPTION OF REFERENCE NUMERALS

1 Driving assistance system
11 Imaging device
12 Ranging device
13 State detection device
14 Map information
15 Position detection device
16 Navigation device
17 Vehicle control device
171 Vehicle speed control device
172 Steering control device
18 Display device
19 Driving assistance device (lane recognition device)
191 CPU (processor)
192 ROM
193 RAM
20 Control unit
21 Acquisition unit
22 Detection unit
23 Recognition unit
24 Estimation unit
B1, B2, B3, B3a, B4, B5, B6 Boundary
C Center line
L1, L2, L3, L4, L5, L6 Lane
X Detection area
Y1, Y2 Travelable area
V Vehicle

The invention claimed is:

1. A lane recognition method for recognizing a travel lane of a vehicle by using a processor to perform cross-check between first boundary information about a boundary dividing lanes and second boundary information about the boundary dividing the lanes, the first boundary information being acquired from map information, the second boundary information being acquired from a detection device of the vehicle, wherein
   the processor detects a movable center line from at least one of the first boundary information and the second boundary information, the movable center line being a center line that can move in a width direction of a road on which the vehicle travels, and
   when the movable center line is detected, the processor does not perform the cross-check between the first boundary information and the second boundary information on one of a right side and a left side of the vehicle on which the movable center line is detected.

2. The lane recognition method according to claim 1, wherein when the movable center line is no longer detected after the movable center line is detected, the processor restarts the cross-check on a side on which the movable center line is no longer detected.

3. The lane recognition method according to claim 1, wherein
   when the movable center line is detected from the second boundary information, the processor determines whether or not a position of the movable center line is within an adjacent lane to the travel lane and whether or not the movable center line is the boundary of the travel lane,
   when determining that the position of the movable center line is within the adjacent lane or determining that the movable center line is the boundary of the travel lane, the processor does not perform the cross-check on a side on which the movable center line is detected, and
   when determining that the position of the movable center line is not within the adjacent lane and determining that the movable center line is not the boundary of the travel lane, the processor performs the cross-check on the side on which the movable center line is detected.

4. The lane recognition method according to claim 1, wherein when the movable center line is detected, the processor performs the cross-check on a side opposite to a side on which the movable center line is detected.

5. The lane recognition method according to claim 1, wherein
   the first boundary information includes a type of the boundary of the lanes on the road on which the vehicle travels,
   the second boundary information includes the type of the boundary of the lanes detected by the detection device, and
   when performing the cross-check, the processor compares the type of the boundary included in the first boundary information with the type of the boundary included in the second boundary information sequentially from the right side or left side with respect to a traveling direction of the vehicle.

6. A lane recognition device comprising:
   a recognition unit that recognizes a travel lane of a vehicle by performing cross-check between first boundary information about a boundary dividing lanes and second boundary information about the boundary dividing the lanes, the first boundary information being acquired from map information, the second boundary information being acquired from a detection device of the vehicle; and
a detection unit that detects a movable center line from at least one of the first boundary information and the second boundary information, the movable center line being a center line that can move in a width direction of a road on which the vehicle travels,
wherein when the movable center line is detected by the detection unit, the recognition unit does not perform the cross-check between the first boundary information and the second boundary information on one of a right side and a left side of the vehicle on which the movable center line is detected.

* * * * *